Patented Oct. 15, 1935

2,017,762

UNITED STATES PATENT OFFICE 2,017,762

ROTATABLE CYLINDER FOR DRYING AND OTHER PURPOSES

Harry Lord, Bury, England, assignor to Walmsleys (Bury) Limited, Bury, England, a British company Application January 30, 1935, Serial No. 4,167
In Great Britain October 13, 1934

4 Claims. (Cl. 34—4)

The present invention relates to rotatable cylinders for drying and other purposes and is particularly applicable to steam heated rotatable cylinders adapted for use in drying paper during its manufacture.

Where a rotatable cylinder is internally heated by steam for drying material passing over the external periphery of the cylinder, one of the usual methods in practice at the present time is to withdraw the condensate from within the cylinder by the aid of a fixed siphon tube, the inlet end to which is situated in the region of the base of the cylinder. This method of condensate withdrawal has its disadvantages in that firstly a differential pressure internally of the cylinder and at the point of exhaust of the condensate from the plant is required whilst secondly the siphon does not operate until a relatively large quantity of condensate has accumulated at the base of the cylinder.

Another known method is to pick up the condensate by rotatable scoops or buckets mounted in a spiral about the axis of rotation of the cylinder. The disadvantage in this construction, however, is that at all speeds the evacuation of condensate is retarded by centrifugal force exerted on the condensate and at high speeds the centrifugal force is such as to wholly prevent evacuation.

As the accumulation of condensate on the inner cylinder walls has an insulating effect it has been found that neither the siphonic action nor that of revolving buckets mounted on the cylinder axle is sufficient for present practical uses particularly where cylinders of large diameter and rotating at a high speed are involved, and the object of the present invention is to overcome these difficulties.

According to the present invention the condensate of the cylinder walls is maintained at a substantially negligible depth by the use of one or more buckets which are adapted to pick up the condensate from the internal periphery of the cylinder during its rotation and deposit the condensate thus picked up into a fixed conduit through which it falls by gravity to an exit nozzle situated externally of the cylinder.

The buckets may revolve about the axis of the cylinder in which case they are secured to the cylinder wall and deposit condensate into the fixed conduit when travelling above their axis of revolution. Again, they may be stationary and mounted adjacent the cylinder wall and above the axis of the cylinder in which case the space between the buckets and the internal periphery of the cylinder may be adjusted to compensate for wear of moving parts so that at all times the edges of the buckets may be maintained just out of contact with said cylinder walls.

Where it is desired to rotate cylinders at varying speeds, i. e. from zero up to very high speeds, such as for example, where the peripheral speed of the cylinder is in the region of 1500 feet per minute, it is preferred to use both types of buckets in combination and to mount a trough for receiving the condensate from the movable buckets on a branch conduit to that supporting the fixed bucket or buckets, whereby each fixed bucket is slightly spaced longitudinally of the cylinder from its co-operating moving buckets. In this way, should the cylinder be rotated at a relatively small speed the movable buckets will discharge condensate at a rate consistent with its formation in order to prevent insulation of the cylinder walls, whilst when the peripheral speed of the cylinder is increased it is found that both the movable and fixed buckets operate to discharge the condensate and that quite a considerable variation in speed takes place before this condition of operation ceases. At very high speeds which are of such a nature as to prevent effective operation of the movable buckets it is found that the fixed buckets alone operate to remove the condensate at the same rate at which it is formed.

The invention is more particularly described with reference to the accompanying drawings, which show a construction in which both types of buckets are used in combination and in which:—

Figure 1:
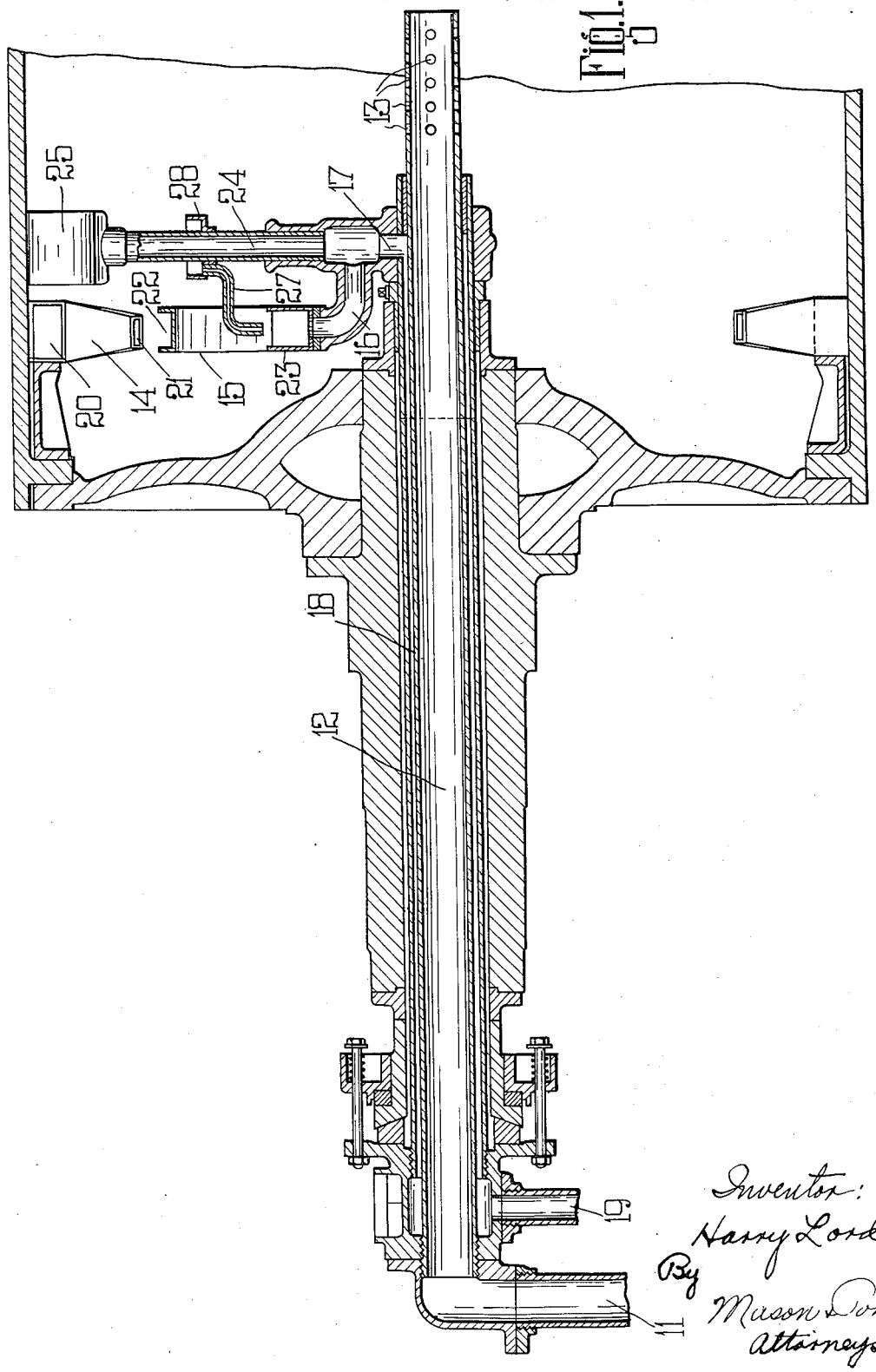
Figure 1 is a longitudinal sectional view through a cylinder, only one end thereof being shown, the opposite end insofar as the buckets are concerned being similar to that shown in the drawings.
Figure 2:
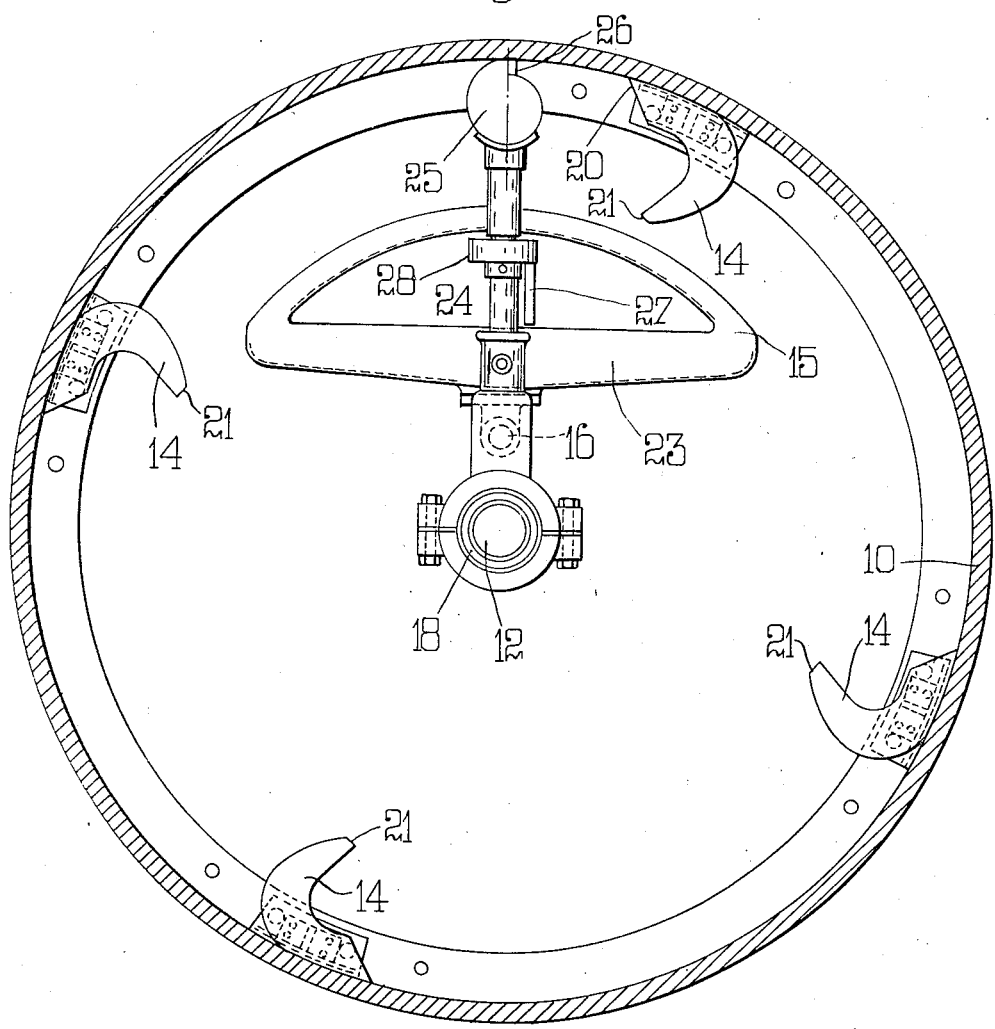
Figure 2 is a corresponding sectional view in a plane normal to the axis of the cylinder.

In the construction according to the drawings the cylindrical shell 10 has a steam inlet 11, the steam passing from said inlet through an axially disposed conduit 12 thence through holes 13 into the cylinder. A number of buckets 14 preferably spaced equidistantly apart are mounted on the internal periphery of the cylinder to rotate therewith about the axis of the cylinder. These buckets are adapted to pick up condensate from the base of the cylinder and to deposit such condensate into a trough 15 situated above the central horizontal plane of the cylinder whereby the condensate may descend by gravity through a conduit 16 and thence via a conduit 17 and annulus 18 into a water outlet 19.

A single group of buckets with four in the group is shown in the drawings, but it will be appreciated that a similar group is preferably provided also at the opposite end of the cylinder. There is no necessity to provide buckets intermediate the cylinder ends as the action of the buckets in picking up the condensate at the ends of the cylinder will cause that portion of the condensate situated intermediate the ends to flow towards the ends and to be picked up by the buckets.

It will be noticed that each of the buckets which rotates with the cylinder is of hollow arcuate form substantially in the form of a horn, each of these buckets being open at the end 20 adjacent the periphery of the cylinder to pick up condensate during its lower portion of travel and is open at the other end 21 to permit discharge of the condensate into the trough 15 during the upper portion of travel of the bucket.

The trough 15 is preferably of the open form, that is to say it consists of an open upper channel 22 which is of arcuate form in side view, the ends of the channel 22 merging into a channel 23 having a central opening leading to the conduit 16. To enable the channel 22 to have hydraulic communication with the channel 23, the web of the channel section 22 is cut away at each end, the joint between the two channel sections being effected in the side walls only of the channel sections.

In the construction according to the drawings each end of the cylinder is also provided with a fixed conduit which projects upwardly from the axis of rotation of the cylinder and is indicated at 24. This conduit 24, together with the conduit 16 leading from the trough 15, may be truly vertical or again may be at any other desired inclination to the vertical so long as it extends upwardly from the axis of rotation of the cylinder to enable condensate deposited in the conduits to flow by gravity towards the conduit 17 and the annulus 18 and thence to the water outlet 19.

The fixed bucket at each end of the cylinder is represented at 25 and is mounted at the top of a fixed conduit 24 the inlet for condensate to the fixed bucket being at 26 and the exit therefrom at that portion where the bucket is connected to the conduit 24.

It will be noticed that the fixed buckets are substantially in the form of a drum having end walls and a spiral periphery between the walls, the pitch of the spiral determining the area of opening 26 for picking up condensate from the internal periphery of the cylinder as it passes the fixed bucket.

In the drawings a single outlet 17 for condensate from the fixed and rotary buckets is shown, this being due to the fact that the conduit 16 leading from the trough 15 is formed as a branch of the conduit 24 from the fixed bucket. If desired, however, the conduits 16 and 24 may be separated.

A tray 28 is provided around the conduit 24 to catch any condensate which may drip down the outside of the upper end of the conduit 24, a pipe 27 being provided from said tray 26 to the open channel portion 22 of the trough 15.

Instead of providing an annulus 18 surrounding the steam inlet 12 for removing the condensate from the outlet 17 to the outlet 19, the water outlet may consist of a conduit co-axial with the steam inlet 12 so that the steam inlet surrounds the water outlet.

I declare that what I claim is:—

1. A drying cylinder comprising a rotatable cylindrical shell, means for supplying steam internally of said shell, fixed buckets situated above the axis of rotation of said shell and in the path of condensate carried by the internal periphery of said shell, buckets connected to the periphery of said shell for displacement therewith and gravitational discharge means common both to said fixed buckets and to said movable buckets for removing condensate picked up thereby.

2. A drying cylinder comprising a rotatable cylindrical shell, means for supplying steam internally of said shell, buckets fixed to the internal periphery of said shell to be displaced therewith, a trough to pick up condensate from said buckets during the upper portion of travel of said buckets around the axis of rotation of said shell, a conduit extending upwardly from the axis of rotation of said shell for gravitational discharge of said condensate from said trough, a second conduit extending above said axis of rotation of said shell and a fixed bucket hydraulically connected to the upper end of said second conduit and having an inlet adjacent the internal periphery of said shell.

3. A drying cylinder comprising a rotatable cylindrical shell, means for supplying steam internally of said shell including a perforated pipe extending axially of said shell, a second pipe extending around said steam inlet pipe over a portion of its length, a conduit extending upwardy from said inlet pipe, a branch conduit leading from said upwardly extending conduit, a fixed bucket hydraulically connected to said first conduit at the top thereof for picking up condensate from the internal periphery of the cylinder wall, a trough connected to the upper end of said branch conduit and buckets fixed to the internal periphery of said cylinder for depositing said condensate into said trough.

4. A drying cylinder comprising a rotatable cylindrical shell, means for supplying steam internally of said shell including a perforated pipe extending axially of said shell, a second pipe extending around said steam inlet pipe over a portion of its length, a conduit extending upwardly from said inlet pipe, a branch conduit leading from said upwardly extending conduit, a fixed bucket hydraulically connected to said first conduit at the top thereof for picking up condensate from the internal periphery of the cylinder wall, a trough connected to the upper end of said branch conduit, buckets fixed to the internal periphery of said cylinder for depositing said condensate into said trough, a tray surrounding said main conduit for picking up condensate dripping downwardly of said conduit and a pipe leading from said tray to said trough.

HARRY LORD.